United States Patent [19]
Robertson

[11] Patent Number: 5,244,004
[45] Date of Patent: Sep. 14, 1993

[54] HYDRAULIC PIPELINE VALVE OPERATING SYSTEM

[75] Inventor: Russell E. Robertson, Ashland, Ohio

[73] Assignee: The Shafer Valve Company, Mansfield, Ohio

[21] Appl. No.: 984,477

[22] Filed: Dec. 2, 1992

[51] Int. Cl.$^5$ ............................................. F01B 31/00
[52] U.S. Cl. ...................................... 137/14; 60/329; 92/130 C; 137/468; 137/492.5
[58] Field of Search ............................ 60/329; 92/130 C; 137/468, 492.5, 14; 251/63

[56] References Cited

U.S. PATENT DOCUMENTS

| | | | |
|---|---|---|---|
| 2,691,518 | 10/1954 | Smith | 60/329 X |
| 2,935,999 | 5/1960 | Hock et al. | 137/468 |
| 3,073,331 | 1/1963 | Faisandier | 251/63 X |
| 3,648,967 | 3/1972 | O'Neill et al. | 60/329 |
| 4,328,672 | 5/1982 | Zumstein | 137/492.5 X |
| 4,685,294 | 8/1987 | Mount | 60/329 |

FOREIGN PATENT DOCUMENTS

| | | | |
|---|---|---|---|
| 1035441 | 7/1958 | Fed. Rep. of Germany | 137/492.5 |
| 184374 | 10/1983 | Japan | 137/468 |
| 870893 | 6/1961 | United Kingdom | 137/492.5 |

*Primary Examiner*—Stephen M. Hepperle
*Attorney, Agent, or Firm*—Renner, Kenner, Greive, Bobak, Taylor & Weber

[57] ABSTRACT

A hydraulic pipeline valve operating system (10) includes a tank (12) which holds a quantity of unpressurized hydraulic fluid. A pump (14) provides that fluid under pressure to a valve actuator (11). The valve actuator has an actuator cylinder (40) having a piston (42) which is operatively connected to the pipeline valve (28). The fluid under pressure moves the piston (42) of the cylinder (40) to compress a spring (35) to open the valve (28). When the piston (42) of the cylinder (40) ceases movement, continued pumping moves a piston (53), of a smaller diameter than the piston (42), which also acts against the spring (35). An indicator rod (60) gives a visual indication of the position of the piston (53) and when it is at approximately its midstroke location, pumping of the fluid is terminated and the actuator (11) is set. Should ambient temperature conditions change, the piston (53) moves to accommodate such changes thereby leaving the piston (42) unaffected. When a pressure sensing valve (22) senses a predetermined pressure change in the fluid in the pipeline, a dump valve (23) is opened permitting the pressurized fluid in the system (10) to be transferred back to the tank (12). The spring (35) can thus move the piston (42) to close the pipeline valve (28).

26 Claims, 3 Drawing Sheets 5,244,004

HYDRAULIC PIPELINE VALVE OPERATING SYSTEM

TECHNICAL FIELD

This invention relates to a hydraulic operating system for valves in pipelines, such as oil and gas pipelines. More particularly, this invention relates to a system which can automatically close a valve to shut down a pipeline upon the occurrence of an emergency, such as upon detection of a pipeline leak. Specifically, this invention relates to such a system which will account for and be operable during changes in ambient temperature which might result in changes in volume in the hydraulic fluid that could otherwise cause system malfunctions.

BACKGROUND ART

Hydraulic operating systems for pipeline valves are known in the art. In such systems, a closed hydraulic circuit provides pressure to a piston which operates against a spring. Upon an emergency situation, such as a pipeline leak or break, the pressure against the spring is released and the spring closes a valve in the pipeline until the emergency situation can be corrected at which time the system is re-pressurized to open the valve.

One of the major problems with such systems is that when in their natural environment, they can be exposed to a wide range of ambient temperature fluctuations, not only winter to summer temperature variations but also the variations which might occur from nighttime to daytime. For example, if colder situations are encountered after the system is initially set, contraction of the hydraulic fluid and the concomitant reduction in pressure on the operating spring could cause an undesirable valve drifting situation. Similarly, as the ambient temperature heats up, the expansion of the fluid in the closed system puts undue pressure on the system components which may result in their failure.

In an attempt to at least partially solve this problem, one prior art system is provided with a relief valve such that upon warmer ambient conditions, the expanded hydraulic fluid blows by the relief valve so that undue pressure is not placed on the operating spring. However, when the ambient temperature later cools, the drop in hydraulic pressure in the system allows the spring to move the operating piston potentially resulting in a partial closing of the pipeline valve.

In another similar system a hydraulic accumulator is provided to receive the excess hydraulic fluid upon thermal expansion. However, not only does such an accumulator significantly add to the expense of the system, but also it is plagued with the same problems encountered by the system with the relief valve just described, that is, when the ambient temperature cools, the hydraulic fluid in the accumulator cannot return to the actuator.

Thus, despite the need for a system which can account for both thermal expansion and thermal compression, no one has developed such a system, let alone a system which does not require additional operating components.

DISCLOSURE OF THE INVENTION

It is thus a primary object of the present invention to provide a hydraulic pipeline valve operating system, the operation of which is not adversely effected by ambient temperature fluctuations.

It is another object of the present invention to provide a hydraulic pipeline valve operating system, as above, which includes a spring powered valve actuator.

It is a further object of the present invention to provide a hydraulic pipeline valve operating system, as above, in which the actuator is automatically adjusted for changes in fluid volume without effecting the valve position.

It is an additional object of the present invention to provide a hydraulic pipeline valve operating system, as above, which can be universally utilized with all types of pipeline valves, such as gate, rising stem, quarter turn ball, or butterfly valves.

It is yet another object of the present invention to provide a hydraulic pipeline valve operating system which does not require additional separate components to account for changes in the ambient temperature.

These and other objects of the present invention, as well as the advantages thereof over existing prior art forms, which will become apparent from the description to follow, are accomplished by the improvements hereinafter described and claimed.

In general, a system in accordance with the present invention includes a tank which holds a quantity of unpressurized hydraulic fluid. A pump transfers pressurized fluid to a first piston and a second piston of a valve actuator to compress a spring. The first piston is operably connected to the valve such that the valve is opened when the first piston is pressurized and closed when the pressure is released from the first piston. The second piston is movable upon a change in the fluid pressure caused, for example, by a change in the ambient temperature which does not effect the position of the first piston.

A preferred exemplary hydraulic pipeline valve operating system incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
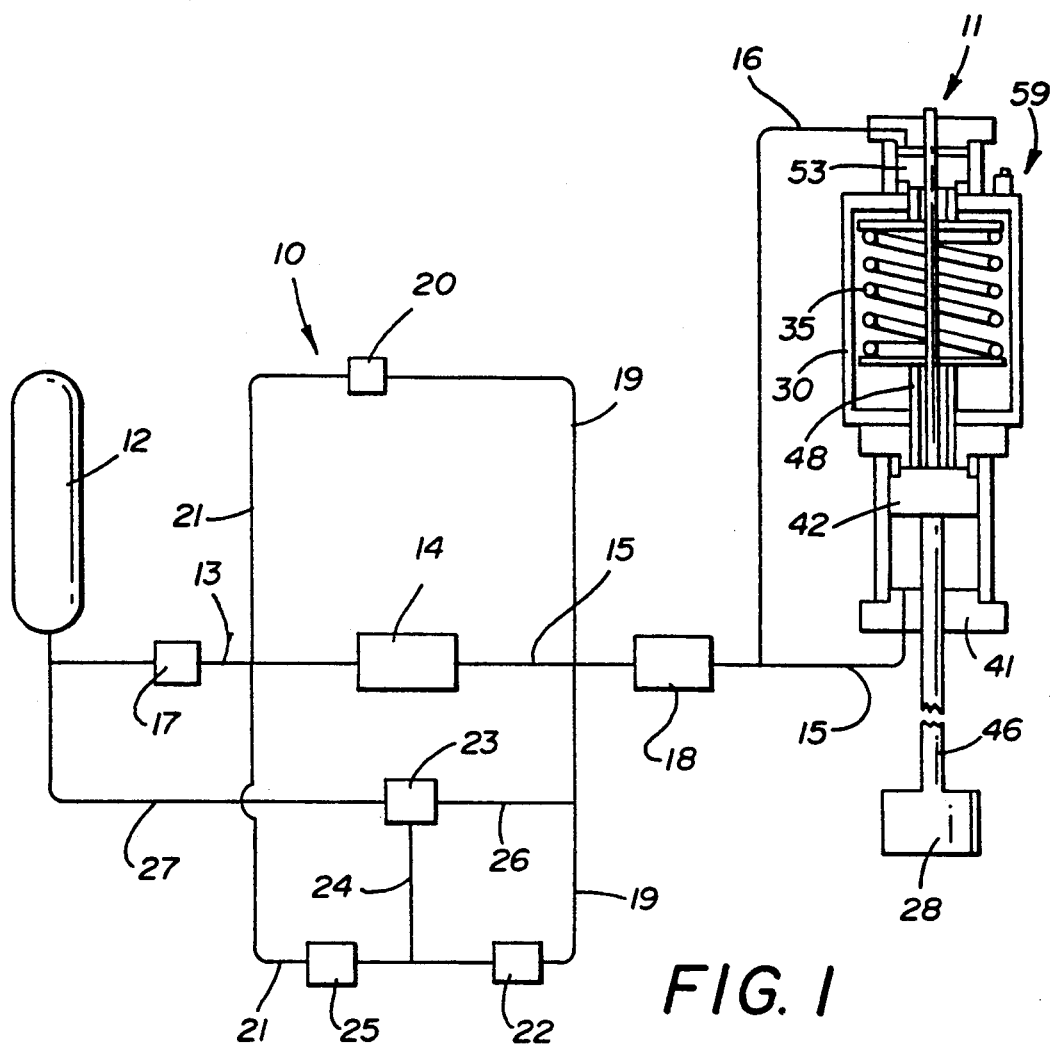
FIG. 1 is a schematic of a hydraulic pipeline valve operating system made in accordance with the present invention.

A hydraulic pipeline valve operating system made in accordance with the concepts of the present invention is shown in FIG. 1 and indicated generally by the numeral 10. System 10 is a closed hydraulic system which includes a number of conventional components interconnected by a plurality of hydraulic fluid carrying lines, and also includes a unique actuator indicated generally by the numeral 11.

The generally conventional components include a vented hydraulic fluid reservoir tank 12 which holds a quantity of unpressurized hydraulic fluid and provides the same through line 13 upon actuation of a pump 14. Pump 14, which may be a manually operated hand pump, provides hydraulic fluid under pressure through line 15 to one end of actuator 11 and through line 16 to the other end of actuator 11. Typical hydraulic pressures within system 10 are preferably in the range of 750 to 1000 psi. A filter 17 may be provided in line 13 to prevent any contaminants from passing to the working components of system 10. A pressure gauge 18 may be provided in line 15 so that the pressure of the system may be monitored.

The pressurized hydraulic fluid in line 15 is also provided through line 19 to a pressure relief valve 20 so that should, for any reason, an over-pressure condition exist, hydraulic fluid will be vented back through lines 21 and 13 to tank 12. The pressurized hydraulic fluid in line 19 is also provided to a pressure sensing valve 22 which monitors the fluid pressure, that is, the pressure of the liquid or gas in the pipeline being serviced by system 10. When valve 22 senses a predetermined deviation in the pipeline pressure indicative of, for example, a leak in the pipeline, it opens allowing hydraulic pressure to be received by the pilot, of a dump valve 23 in line 24. An orifice 25 in line 21 prevents the pressure from going back to tank 12 thereby assuring that dump valve 23 is activated. Dump valve 23 then immediately opens permitting all hydraulic fluid under pressure in lines 15, 16 and 19 to pass through line 26, valve 23, and line 27 back to tank 12. In a manner now to be described, actuator 11 then operates to shut down the pipelines by closing a pipeline valve 28.

Figure 2:
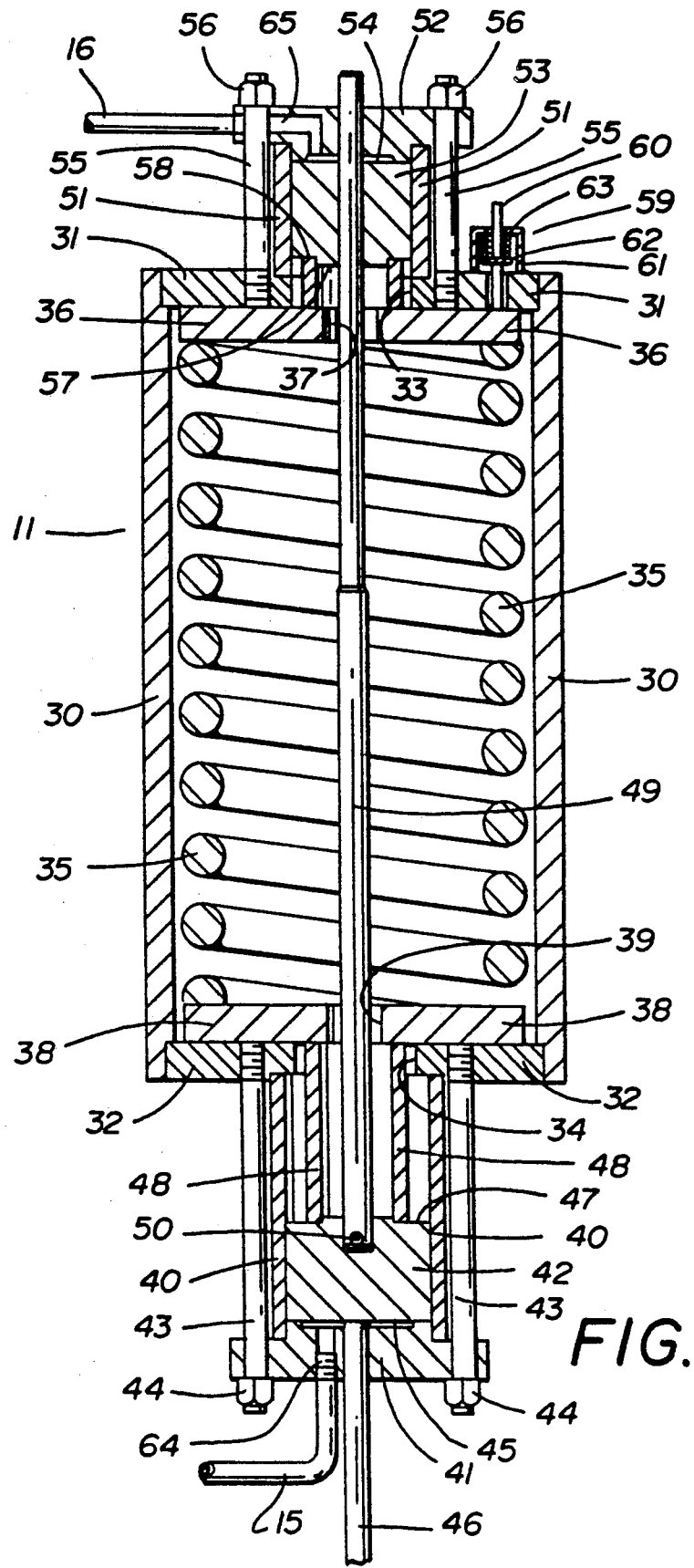
FIG. 2 is a vertical sectional view of the actuator made in accordance with the concepts of the present invention shown in a condition prior to being set in its normal operating condition, which is also its position after it has closed a pipeline valve.
Figure 3:
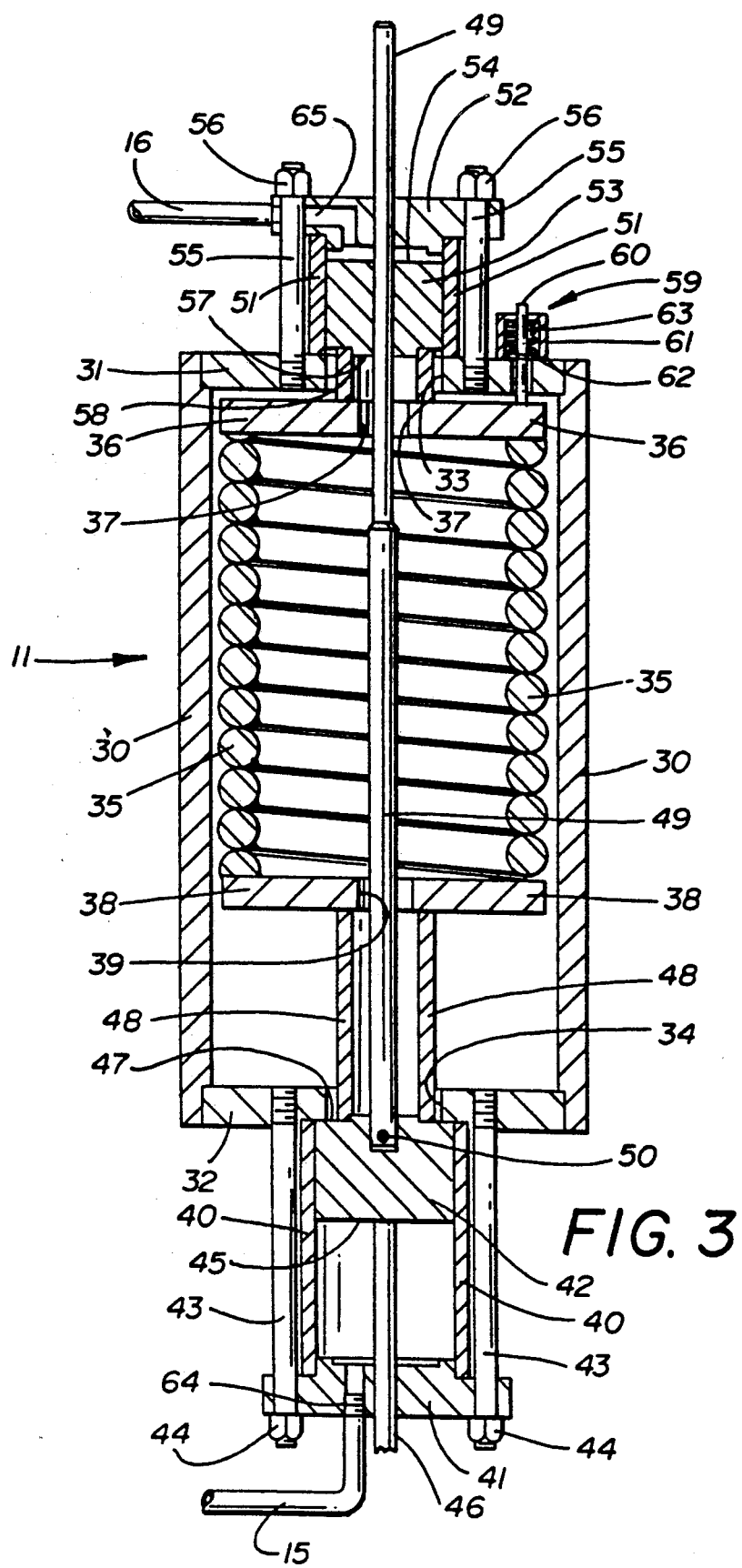
FIG. 3 is a vertical sectional view of the actuator of FIG. 2 shown in its normal operating position ready to close a pipeline valve should an emergency situation be detected.

Actuator 11 is shown somewhat schematically in FIG. 1, but is shown in detail in FIGS. 2 and 3, and includes a spring housing defined by a cylindrical shell 30 and end plates 31 and 32 having central apertures 33 and 34, respectively, therein. A heavy duty coil spring 35 is provided within the spring housing and is axially positioned between and bears against an upper disc 36 having a central aperture 37 therein, and a lower disc 38 having a central aperture 39 therein.

An actuator cylinder 40 having an end cap 41 carries an actuator piston 42 therein. Conventional guides and O-rings (not shown) are provided between cylinder 40 and piston 42. End cap 41 is attached to end plate 32 of the spring housing by studs 43 threadably received in end plate 32 and held in place by hex nuts 44. The outboard end 45 of piston 42 carries an actuator piston rod 46 which is attached to and operates, in a manner known in the art, pipeline valve 28. This can be accomplished by well known linear or rotary motion to stroke valve 28, it only being important that as rod 46 moves axially, valve 28 is opened and closed.

The inboard end 47 of piston 42 bears against one axial end of a cylindrical spacer 48, the other end of which passes through aperture 34 of end plate 32 and axially bears against lower disc 38. A lower piston indicator rod 49 can be pin connected, as at 50, to the inboard end 47 of piston 42. Indicator rod 49 extends from piston 42 upwardly through spacer 48, through aperture 39 in lower disc 38, within spring 35 in the spring housing, and through aperture 37 in upper disc 36.

A control cylinder 51 having an end cap 52 carries a control piston 53 therein. For reasons to be hereinafter described, the diameter of control piston 53 is less than the diameter of actuator piston 42, and thus the area of the surface of the outboard end 54 of piston 53 is less than the area of the surface of the outboard end 45 of piston 42. End cap 52 is attached to end plate 31 of the spring housing by studs 55 threadably received in end plate 31 and held in place by hex nuts 56. The inboard end 57 of piston 53 bears against one axial end of a cylindrical spacer 58, the other end of which passes through aperture 33 of end plate 31 and axially bears against upper disc 36. As will hereinafter be described, because the stroke of actuator piston 42 is greater than that of control piston 53, spacer 58 is axially shorter than spacer 48.

Indicator rod 49 extends upwardly through spacer 58, is slidably received through piston 53 and end cap 52, and terminates above end cap 52. Conventional piston guides and sealing O-rings (not shown) are provided between piston 53 and its cylinder 51, and likewise, O-ring seals (not shown) are provided between rod 49 and piston 53 as well as end cap 52.

An upper piston indicator assembly is indicated generally by the numeral 59 and includes an indicator rod 60 which rests upon upper disc 36 and extends slidably upwardly through end plate 31 of the spring housing and likewise through a bracket 61 mounted on top of end plate 31. Rod 60 carries a spring retaining disc 62 and a coil spring 63 is positioned to bear against bracket 61 and disc 62 thereby biasing rod 60 against disc 36.

The start up, unarmed condition of actuator 11 is shown in FIG. 2. In that condition, lower piston 42 is all the way down in cylinder 40, upper piston 53 is all the way up in cylinder 51, and spring 35 is fully extended with discs 36 and 38 resting against end plates 31 and 32, respectively. With valves 22 and 23 of system 10 in their closed position, pump 14 may be operated to draw hydraulic fluid from tank 12 and pressurize lines 15, 16, 19 and 26 as previously described. The fluid under pressure in line 15 is provided through a port 64 in end cap 41 of actuator cylinder 40 to act against the outboard end 45 of piston 42. At the same time, the fluid under pressure in line 16 is provided through a port 65 in end cap 52 of control cylinder 51 to act against the outboard end 54 of piston 53. However, because the surface of outboard end 45 of piston 42 is of a larger area than that of outboard end 54 of piston 53, as previously described, piston 42 will move first under the hydraulic pressure. By virtue of spacer 48 bearing against disc 38, the upward movement of piston 42 begins to compress spring 35 until piston 42 reaches its fully extended position as shown in FIG. 3. Confirmation that the piston has been so extended can be made by the operator by observing the extent of the extension of indicator rod 49 above end cap 52. In this regard, rod 49 can be provided with graduation indicia to assist the operator in ascertaining that piston 42 has been fully stroked. The movement of piston 42, as previously described, opens the valve 28 which actuator 11 is servicing and the pipeline is then operable.

After piston 42 is fully extended, continued pumping enables piston 53 to move against the force of spring 35. By virtue of spacer 58 bearing against disc 36, spring 35 is further compressed. The extent of the movement of piston 53 is monitored by observing the downward movement of indicator rod 60 which is preferably provided with graduations so that movement of piston 53 can be stopped at the desired location, preferably at half its stroke point as shown in FIG. 3, by discontinuing the operation of pump 14.

Thus, FIG. 3 (FIG. 1 as well) depicts actuator 11 in its normal, armed position ready to close valve 28 if an emergency pipeline pressure situation is detected. As previously described, such a situation is detected by pressure sensing valve 22 which operates dump valve 23 to immediately return all pressurized fluid in lines 15, 16, 19 and 26 to tank 12. Spring 35 then returns to the FIG. 2 position extending rod 46 to close pipeline valve 28.

While such operation is the intended purpose of actuator 11, since it is guarding against only emergency situations, the vast majority of the time it will be in the armed, FIG. 3 condition. In this condition, were it not for control piston 53, ambient temperature fluctuations, prevalent in pipeline operations, could cause false operation of actuator 11. For example, if the ambient temperature turned extremely cold, the reduction in pressure on piston 42 could cause an undesired closing of valve 28.

Control piston 53 and its associated elements guards against this contingency and otherwise accounts for temperature fluctuations in the hydraulic fluid. For example, if the ambient conditions heat up after actuator 11 has been set in its FIG. 3 condition, the hydraulic fluid expands. But because piston 53 is set at approximately its midstroke position, such expansion is accommodated by a small downward movement of piston 53 and piston 42 is not effected. If, on the other hand, colder ambient conditions are present, the fluid will tend to contract but piston 42 will not move because piston 53 will move upward from the FIG. 3 position to accommodate that temperature change. Thus, as designed and as described herein, actuator 11 can satisfactorily operate to protect from false activations in ambient temperatures ranging from −50° F. to 250° F.

The preferred embodiment of system 10, as described, thus accomplishes the objects of the present invention and otherwise substantially improves the pipeline control art. However, other substantially equivalent embodiments are clearly within the scope of this invention. For example, a system could be designed without a separate tank 12 by merely utilizing the unpressurized space within the actuator spring housing to store the hydraulic fluid. This and other modifications are clearly within the scope of the present invention.

I claim:

1. A system for opening and closing a valve comprising tank means to hold a quantity of unpressurized hydraulic fluid, actuator means to open and close the valve, and pump means communicating with said tank means and pressurizing the fluid to provide the fluid to said actuator means, said actuator means including first piston means operably connected to the valve and acted upon by the pressurized fluid to move to open the valve, second piston means acted upon by the pressurized fluid and movable upon a change in the fluid pressure, and spring means acting against said first and second piston means so that only upon release of the fluid under pressure, can said first piston means move to close the valve.

2. A system according to claim 1, said actuator means further including rod means attached to said first piston means to provide a visual indication of the position of said first piston means.

3. A system according to claim 2 wherein said rod means extends slidably through said second piston means.

4. A system according to claim 1, said actuator means further including means to provide a visual indication of the position of said second piston means.

5. A system according to claim 1 wherein said first piston means is positioned at one end of said spring means and said second piston means is positioned at the other end of said spring means.

6. A system according to claim 5 wherein said first piston means is larger than said second piston means so that said first piston is acted upon by the pressurized fluid before said second piston means is acted upon by the pressurized fluid.

7. A system according to claim 5, said actuator means further including a housing for said spring means, first disc means bearing against said one end of said spring means, and second disc means bearing against said other end of said spring means.

8. A system according to claim 7, said actuator means further including first spacer means extending from said first piston means into said housing to bear against said first disc means, and second spacer means extending from said second piston means into said housing to bear against said second disc means.

9. A system according to claim 7, said actuator means further including indicator means to provide a visual indication of the position of said second piston means.

10. A system according to claim 9 wherein said indicator means includes a rod member, and biasing means maintaining said rod member in contact with said second disc means.

11. A system according to claim 1 further comprising means to release said fluid pressure should said pump means pressurize the fluid above a predetermined pressure.

12. A system according to claim 1 wherein the valve is in a pipeline carrying fluid under pressure and further comprising valve means to sense the pressure of the fluid in the pipeline, and dump valve means actuated by said valve means upon detection of a pressure change of a predetermined amount to release the pressurized fluid from said first and second piston means back to said tank means.

13. Apparatus for opening and closing a valve comprising a spring member, a piston, means to provide fluid under pressure to said piston to move said piston to open the valve and compress said spring member, and control means also compressing said spring member and accommodating a change in the fluid pressure so that said piston is not moved in response to a change in the fluid pressure, the bias of said compressed spring member moving said piston to close the valve only upon the release of the fluid pressure.

14. Apparatus according to claim 13 wherein said control means includes a second piston receiving the fluid under pressure.

15. Apparatus according to claim 14 wherein the diameter of said second piston is smaller than the diameter of said piston.

16. Apparatus according to claim 14 wherein said piston is positioned at one end of said spring member and said second piston is positioned at the other end of said spring member.

17. Apparatus according to claim 14 further comprising means to provide a visual indication of the position of said second piston.

18. Apparatus according to claim 17 further comprising means to provide a visual indication of the position of said piston.

19. A valve actuator comprising a spring member, a first cylinder having a piston receiving fluid under pressure to compress said spring member and having a piston rod operatively connected to the valve for opening and closing the valve, a second cylinder having a piston receiving fluid under pressure to compress said spring member, said piston of said first cylinder being of a diameter greater than the diameter of said piston of said second cylinder so that only said piston of said second cylinder will move to accommodate changes in the temperature of the fluid under pressure, said piston of said first cylinder moving under the force of said spring member to close the valve only when the pressure of the fluid is released from said piston of said first cylinder.

20. A valve actuator according to claim 19 further comprising a housing for said spring member, first disc means within said housing at one end of said spring member, and second disc means within said housing at the other end of said spring member.

21. A valve actuator according to claim 20 further comprising first spacer means extending from said piston in said first cylinder into said housing to bear against said first disc means, and second spacer means extending from said piston in said second cylinder into said housing to bear against said second disc means.

22. A valve actuator according to claim 21 further comprising a rod extending from said piston in said first cylinder, through said housing, and slidably through said piston of said second cylinder to provide a visual indication of the position of said piston of said first cylinder.

23. A valve actuator according to claim 21 further comprising an indicator rod in contact with said second disc means, and means to bias said indicator rod against said disc means so that said indicator rod provides a visual indication of the position of said piston in said second cylinder.

24. A method of controlling a valve in a fluid-carrying pipeline to close the same upon detection of a predetermined change in pressure of the fluid in the pipeline comprising the steps of pressurizing a first piston to compress a spring and open the valve, pressurizing a second piston to further compress the spring, accounting for temperature variations by allowing the second piston to move in response thereto, detecting a predetermined change in the pipeline pressure, and thereafter releasing the pressure on the first piston to close the valve.

25. A method according to claim 24 wherein the steps of pressurizing are accomplished by pumping a fluid under pressure to the first and second pistons.

26. A method according to claim 24 wherein the step of pumping is terminated when the second piston reaches a predetermined position thereby allowing the second piston to move in response to temperature variations in the fluid under pressure.

* * * * *

UNITED STATES PATENT AND TRADEMARK OFFICE
CERTIFICATE OF CORRECTION

PATENT NO. : 5,244,004
DATED : September 14, 1993
INVENTOR(S) : Russell E. Robertson It is certified that error appears in the above-identified patent and that said Letters Patent is hereby corrected as shown below:

Cover page, [56], please add the following under Other Publications:

--OTHER PUBLICATIONS

"Operating Manual For Hydraulic Operated-Spring Opposed Valve Actuation Systems", Barber Industries, a Division of Bralorne Resources Limited, P.O. Box 5280 Station A, 9625 Shepard Road S.E., Calgary, Alberta, Canada T2H 2P3, 1988.

"Self Contained Hydraulic Shutdown System", Erichsen Industries Ltd., 4717 - 99 Street, Edmonton, Alberta, Canada T6E 4Y1, no date.--

Signed and Sealed this

Twenty-sixth Day of July, 1994

Attest:

BRUCE LEHMAN

Attesting Officer     Commissioner of Patents and Trademarks